US012188634B1

(12) United States Patent
Griffin

(10) Patent No.: US 12,188,634 B1
(45) Date of Patent: Jan. 7, 2025

(54) FLASHLIGHT WITH ILLUMINATING DOME MEMBER

(71) Applicant: Walter Griffin, Rosedale, MD (US)

(72) Inventor: Walter Griffin, Rosedale, MD (US)

( * ) Notice: Subject to any disclaimer, the term of this patent is extended or adjusted under 35 U.S.C. 154(b) by 0 days.

(21) Appl. No.: 18/581,576

(22) Filed: Feb. 20, 2024

(51) Int. Cl.
*F21V 14/04* (2006.01)
*F21L 4/04* (2006.01)
*F21V 21/40* (2006.01)

(52) U.S. Cl.
CPC ............ *F21V 14/045* (2013.01); *F21L 4/045* (2013.01); *F21V 21/406* (2013.01)

(58) Field of Classification Search
CPC ....... F21V 14/045; F21V 21/406; F21L 4/045
See application file for complete search history.

(56) References Cited

U.S. PATENT DOCUMENTS 4,609,976 A 9/1986 Geissler
6,079,847 A 6/2000 Nelson
6,789,918 B2 9/2004 Poon
D980,480 S 3/2023 Hu
2005/0128740 A1 6/2005 Currie
2011/0058361 A1 3/2011 Houghton
2012/0140455 A1 6/2012 Chang
2017/0002994 A1* 1/2017 Fisher .................. F21V 17/164
2022/0299189 A1 9/2022 Kim

FOREIGN PATENT DOCUMENTS

EP 2295845 3/2011

* cited by examiner

*Primary Examiner* — Evan P Dzierzynski
*Assistant Examiner* — Jessica M Apenteng
(74) *Attorney, Agent, or Firm* — Kyle A. Fletcher, Esq.

(57) ABSTRACT

The flashlight with illuminating dome member is intended for use as a flashlight. The flashlight with illuminating dome member generates an illumination with an adjustable field of illumination. By adjustable field of illumination is meant that the flashlight with illuminating dome member generates a field of illumination selected from the group consisting of: a) an omnidirectional field of illumination (such as area lighting); and, b) a directed field of illumination formed from a collimation of the generated illumination. The flashlight with illuminating dome member incorporates a housing structure and a lamp circuit. The housing structure contains the lamp circuit. The housing structure adjusts the field of illumination generated by the lamp circuit. The lamp circuit is an electric circuit.

13 Claims, 6 Drawing Sheets

FLASHLIGHT WITH ILLUMINATING DOME MEMBER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of systems of electric lighting devices. (F21L2/00)

Summary of Invention

The flashlight with illuminating dome member is a lantern. The flashlight with illuminating dome member is intended for use as a flashlight. The flashlight with illuminating dome member is a lamp. The flashlight with illuminating dome member generates an illumination with an adjustable field of illumination. By adjustable field of illumination is meant that the flashlight with illuminating dome member generates a field of illumination selected from the group consisting of: a) an omnidirectional field of illumination (such as area lighting); and, b) a directed field of illumination formed from a collimation of the generated illumination. The flashlight with illuminating dome member comprises a housing structure and a lamp circuit. The housing structure contains the lamp circuit. The housing structure adjusts the field of illumination generated by the lamp circuit. The lamp circuit is an electric circuit. The lamp circuit generates the illumination.

These together with additional objects, features and advantages of the flashlight with illuminating dome member will be readily apparent to those of ordinary skill in the art upon reading the following detailed description of the presently preferred, but nonetheless illustrative, embodiments when taken in conjunction with the accompanying drawings.

In this respect, before explaining the current embodiments of the flashlight with illuminating dome member in detail, it is to be understood that the flashlight with illuminating dome member is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the flashlight with illuminating dome member.

It is therefore important that the claims be regarded as including such equivalent construction insofar as they do not depart from the spirit and scope of the flashlight with illuminating dome member. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
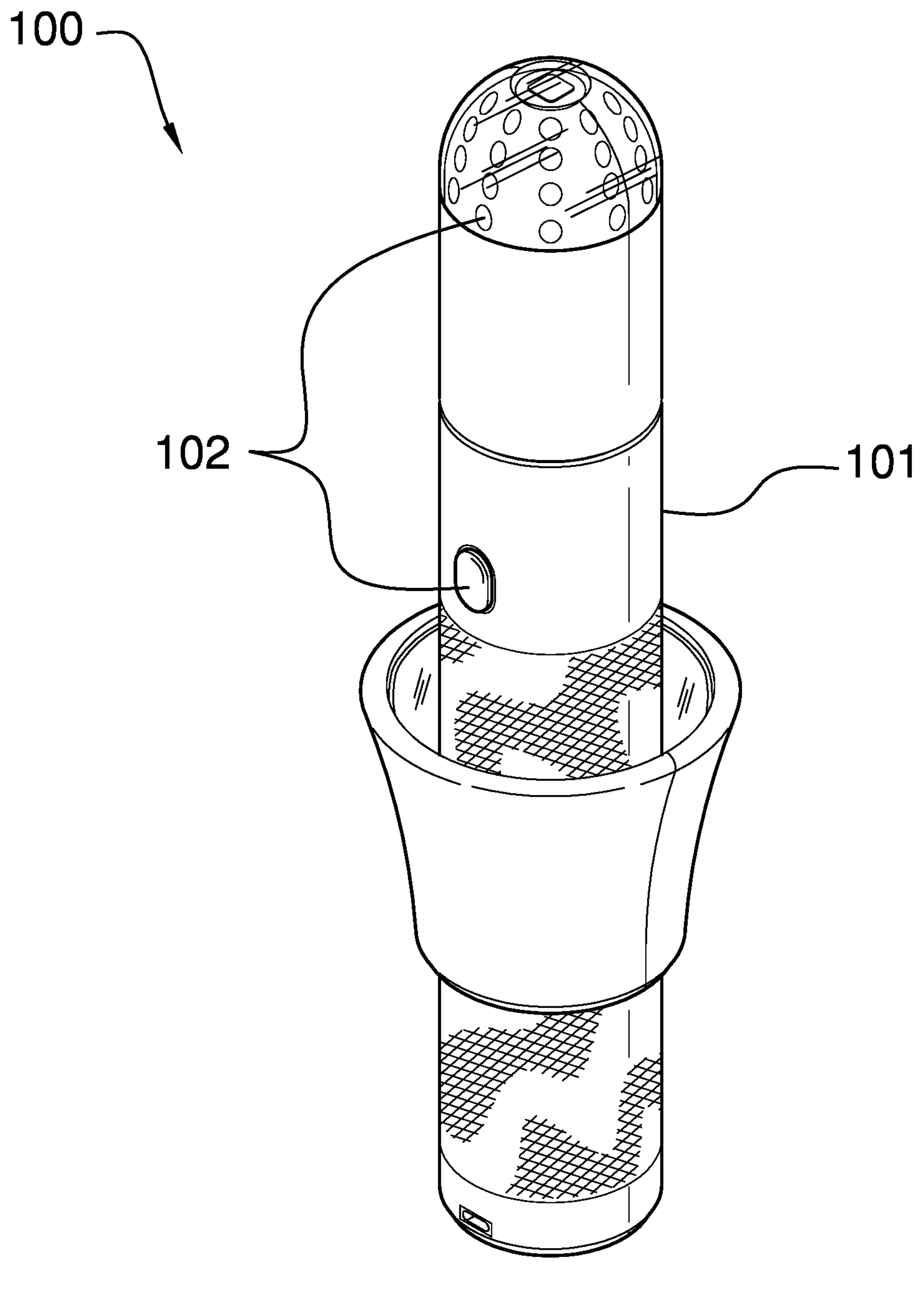
FIG. 1 is a perspective view of an embodiment of the disclosure.
Figure 2:
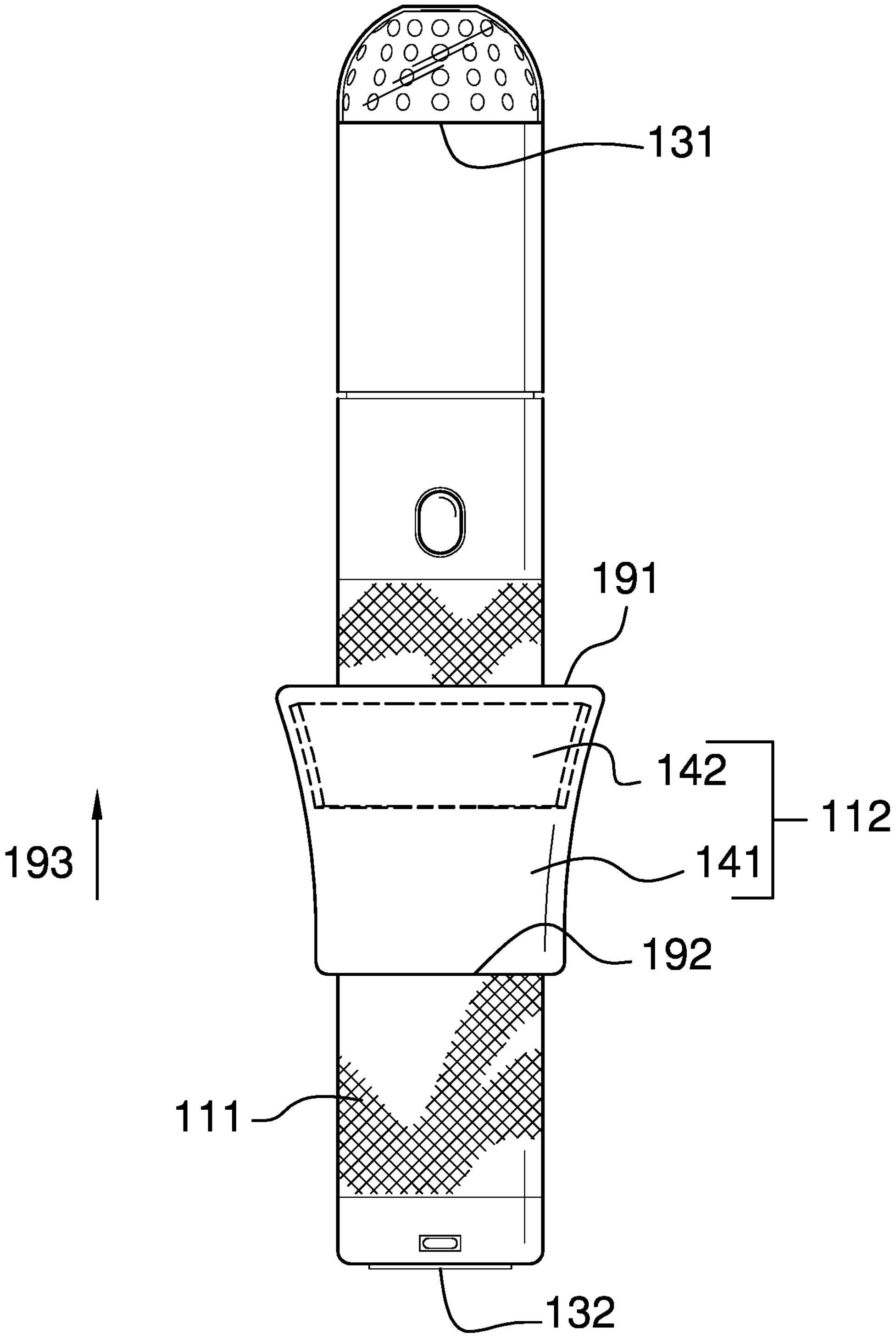
FIG. 2 is a front view of an embodiment of the disclosure.
Figure 3:
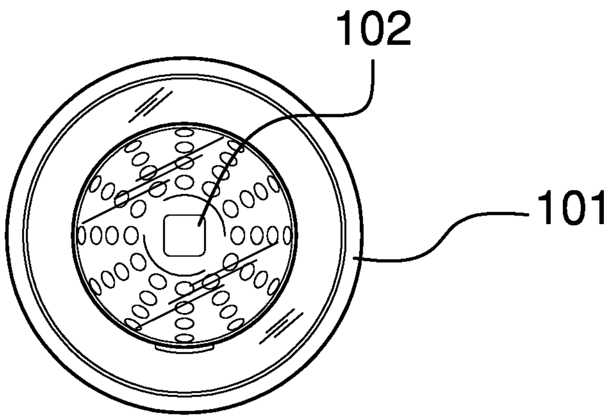
FIG. 3 is a top view of an embodiment of the disclosure.
Figure 4:
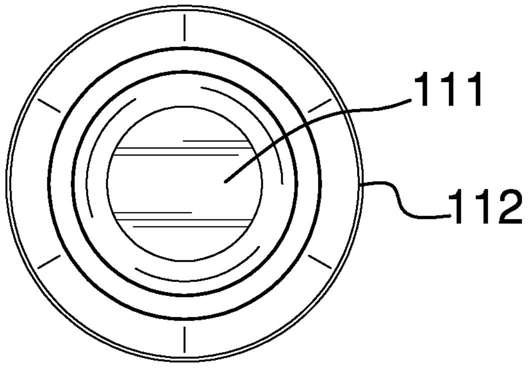
FIG. 4 is a bottom view of an embodiment of the disclosure.
Figure 5:
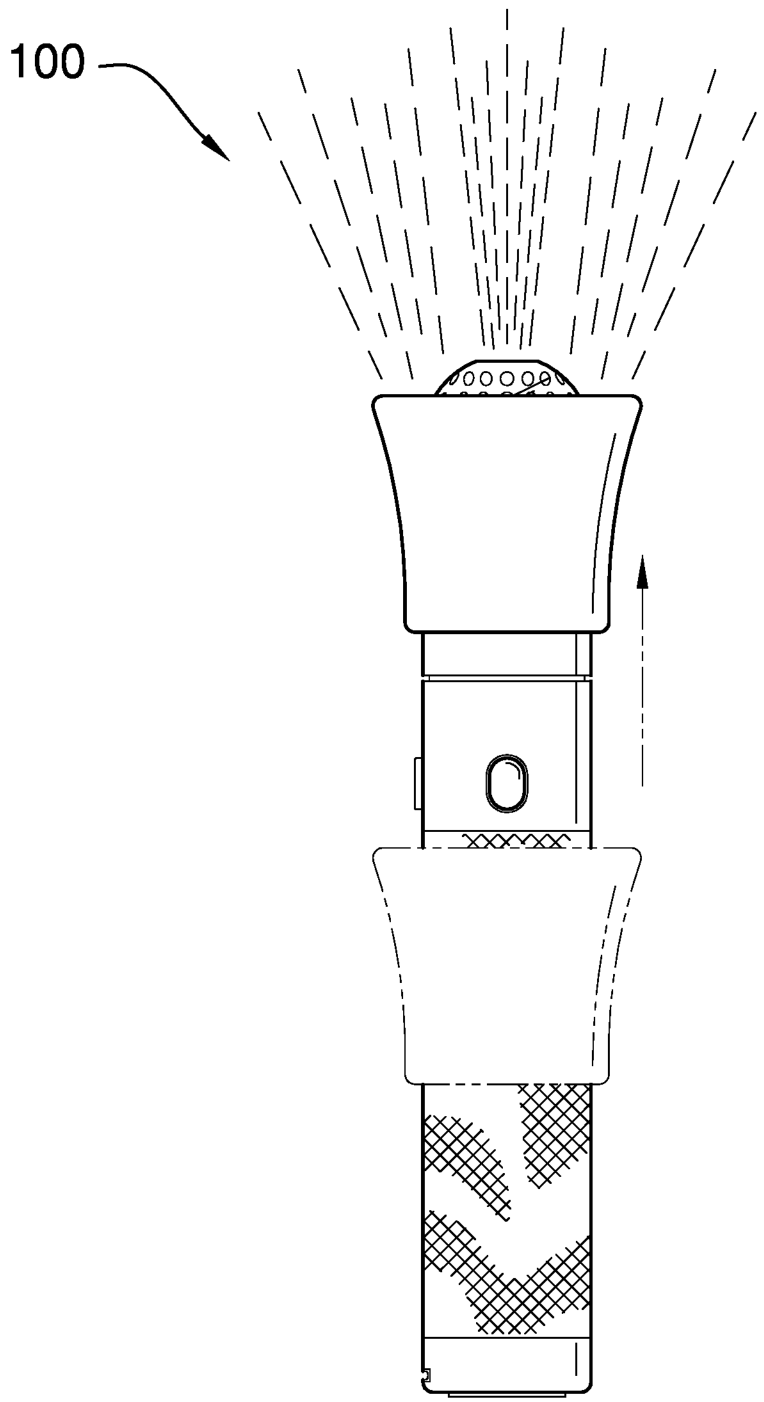
FIG. 5 is an in-use view of an embodiment of the disclosure.
Figure 6:
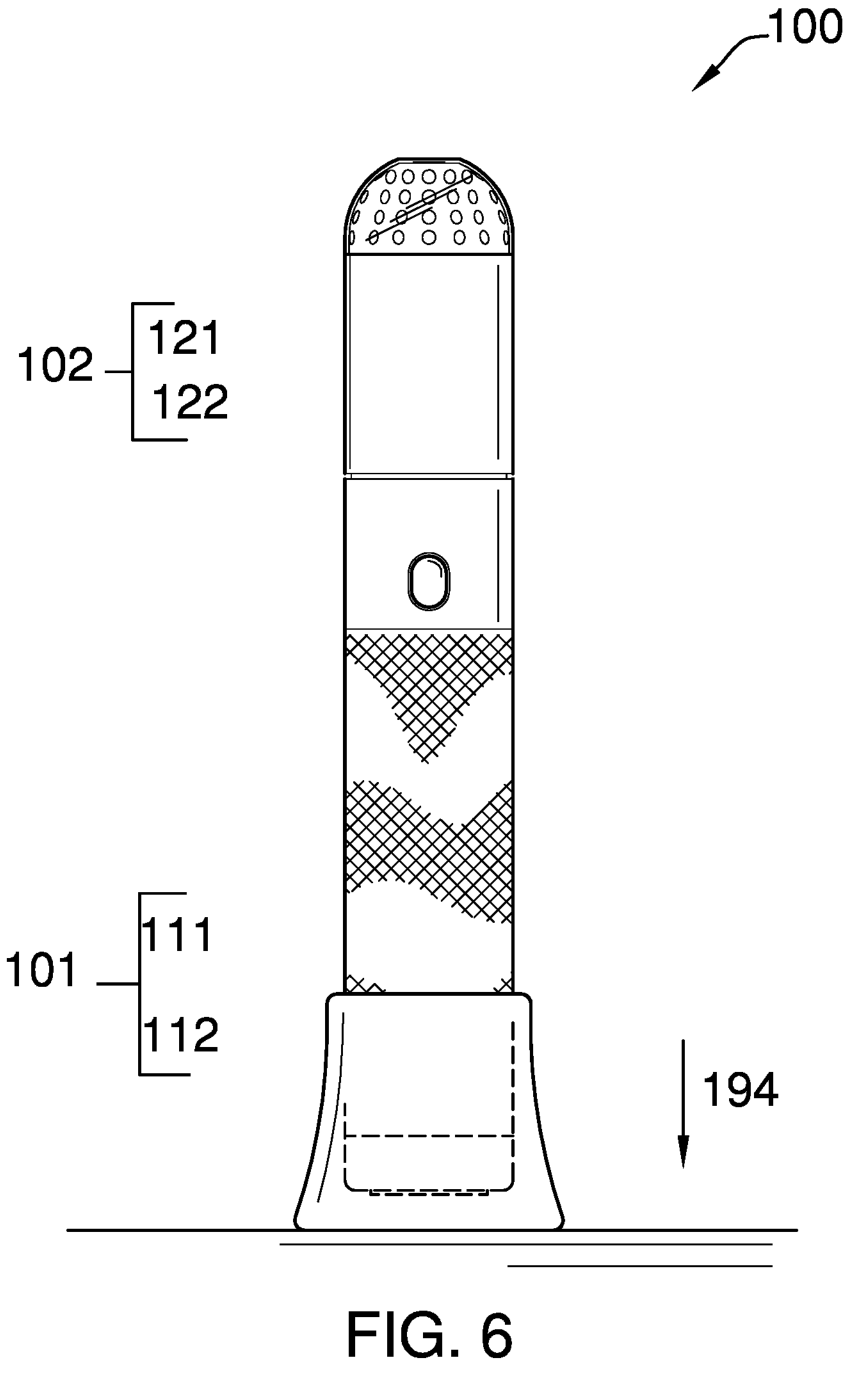
FIG. 6 is another in-use view of an embodiment of the disclosure.
Figure 7:
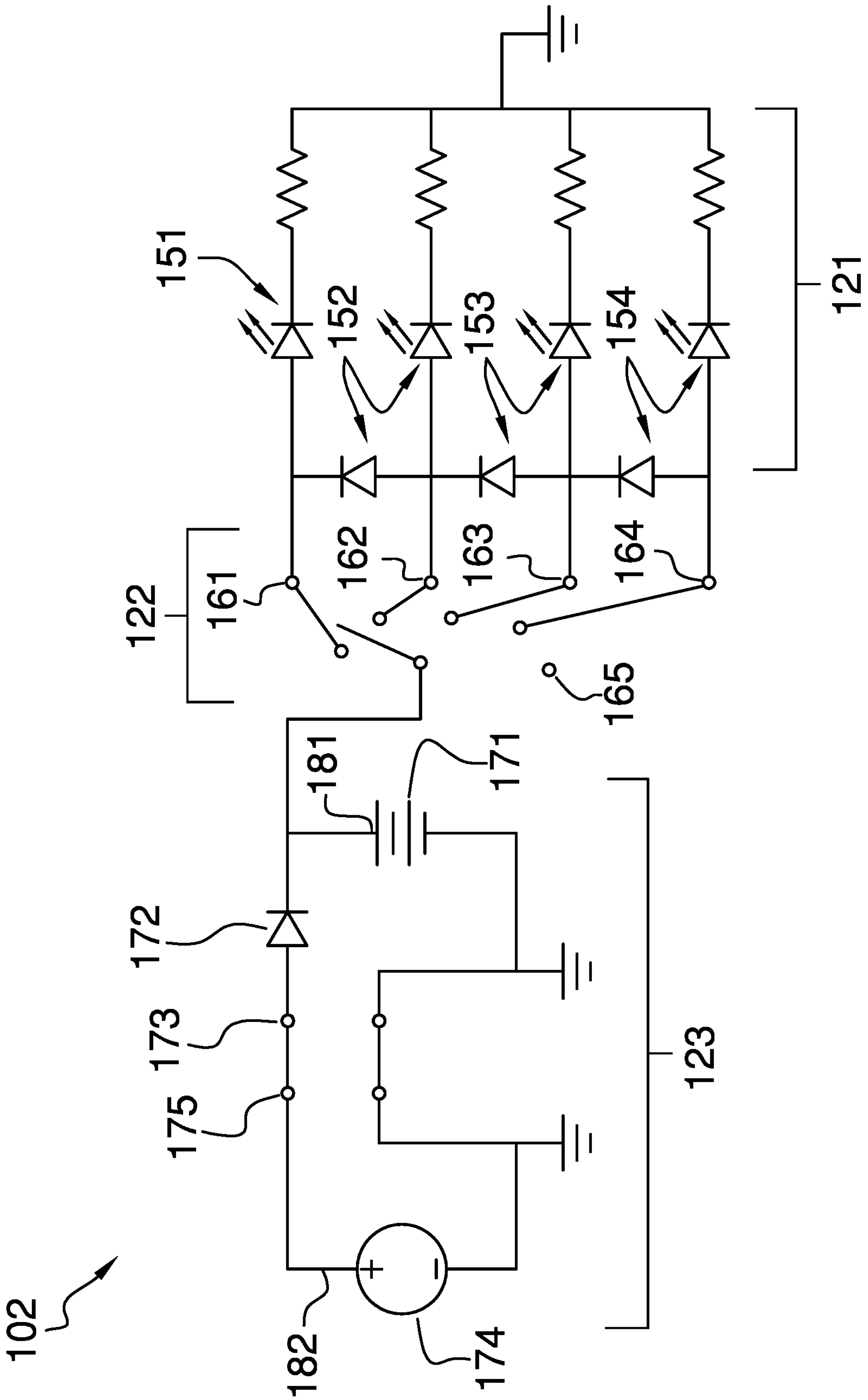
FIG. 7 is a schematic view of an embodiment of the disclosure.

Detailed reference will now be made to one or more potential embodiments of the disclosure, which are illustrated in FIGS. 1 through 7.

The flashlight with illuminating dome member 100 (hereinafter invention) is a lantern. The invention 100 is intended for use as a flashlight. The invention 100 is a lamp. The invention 100 generates an illumination with an adjustable field of illumination. By adjustable field of illumination is meant that the invention 100 generates a field of illumination selected from the group consisting of: a) an omnidirectional field of illumination (such as area lighting); and, b) a directed field of illumination formed from a collimation of the generated illumination. The invention 100 comprises a housing structure 101 and a lamp circuit 102. The housing structure 101 contains the lamp circuit 102. The housing structure 101 adjusts the field of illumination generated by the lamp circuit 102. The lamp circuit 102 is an electric circuit. The lamp circuit 102 generates the illumination.

The housing structure 101 is a rigid structure. The housing structure 101 is a hollow structure. The housing structure 101 has a tubular structure. The housing structure forms a protected space that contains the lamp circuit 102. The housing structure 101 is a handheld structure. The housing structure 101 is a self-standing structure. The housing structure 101 is formed with the apertures and form factors necessary for the operation of the lamp circuit 102. The housing structure 101 forms the mechanical structure that adjusts the field of illumination generated by the lamp circuit 102. The housing structure 101 comprises a grip structure 111 and a sliding reflector 112.

The grip structure 111 is a prism shaped structure. The grip structure 111 is a rigid structure. The grip structure 111 is a hollow structure. The grip structure 111 has a tubular structure. The grip structure 111 forms the protected space that contains the lamp circuit 102. The grip structure 111 forms the grip that is used to carry the invention 100. The grip structure 111 is formed with the apertures and form factors necessary for the operation of the lamp circuit 102. The grip structure 111 comprises a first congruent end 131 and a second congruent end 132. The first congruent end 131 is a congruent end of the prism structure of the grip structure 111. The second congruent end 132 is a congruent end of the prism structure of the grip structure 111. The second congruent end 132 is the congruent end of the grip structure 111 that is distal from the first congruent end 131.

The sliding reflector 112 is a rigid structure. The sliding reflector 112 is a hollow structure. The sliding reflector 112 has a roughly truncated pyramid shape. The sliding reflector 112 is formed with an open base 191 and an open truncated apex 192. The sliding reflector 112 forms a roughly tubular shape. The span of the length of the inner dimension of the sliding reflector 112 is lesser than the span of the length of the outer dimension of grip structure 111.

The sliding reflector 112 attaches to the grip structure 111 by sliding over the lateral face of the grip structure 111. The sliding reflector 112 attaches to the grip structure 111 in a configuration selected from the group consisting of: a) a base forward position 193; and, b) a reversed base position 194. The base forward position 193 is formed when the sliding reflector 112 slides over the grip structure 111 such that the open base 191 is the structure of the sliding reflector 112 that is proximal to the first congruent end 131 of the grip structure 111. The reversed base position 194 is formed when the sliding reflector 112 slides over the grip structure 111 such that the open base 191 is the structure of the sliding reflector 112 that is distal from the first congruent end 131 of the grip structure 111.

The sliding reflector 112 forms a pedestal structure when the sliding reflector 112 is in the reversed base position 194. The sliding reflector 112 maintains the grip structure 111 in a vertically oriented position when the invention 100 rests on a horizontal supporting surface. The sliding reflector 112 forms a reflective structure when the grip structure 111 is in the base forward position 193. The sliding reflector 112 collimates the light generated by the lamp circuit 102 to form the directed field of illumination when the sliding reflector 112 is in the base forward position 193.

The sliding reflector 112 comprises a truncated pyramid structure 141 and a mirror structure 142.

The truncated pyramid structure 141 forms the primary structure of the sliding reflector 112. The truncated pyramid structure 141 has the rough shape of a truncated pyramid. The truncated pyramid structure 141 is a rigid structure. The truncated pyramid structure 141 is a hollow structure. The truncated pyramid structure 141 is formed with the open base 191 and the open truncated apex 192. The truncated pyramid structure 141 forms the tubular structure of the sliding reflector 112. The grip structure 111 inserts through the truncated pyramid structure 141 by inserting through the open base 191 and the open truncated apex 192. The mirror structure 142 mounts in the truncated pyramid structure 141.

The mirror structure 142 is a reflective structure. The mirror structure 142 mounts on the interior lateral face of the truncated pyramid structure 141. The mirror structure 142 collimates the light generated by the lamp circuit 102 into a unidirectional beam of light that is transmitted into the environment through the open base 191 of the sliding reflector 112. The mirror structure 142 collimates the light generated by the lamp circuit 102 when the sliding reflector 112 is in the base forward position 193.

The lamp circuit 102 is an electric circuit. The lamp circuit 102 converts electric energy into electromagnetic radiation used to illuminate the environment surrounding the invention 100. The lamp circuit 102 transmits the electromagnetic radiation into the environment. The lamp circuit 102 is an independently powered electric circuit. By independently powered is meant that the lamp circuit 102 can operate without an electrical connection to an external power source 174.

The lamp circuit 102 comprises a plurality of lamp elements 121, a switch element 122, and a power circuit 123. The plurality of lamp elements 121, the switch element 122, and the power circuit 123 are electrically interconnected. The plurality of lamp elements 121 mounts in the first congruent end of the grip structure 111 such that the illumination generated by the lamp circuit 102 is released from the first congruent end 131. The switch element 122 mounts in the grip structure 111 such that the switch element 122 is accessible from the exterior lateral face of the grip structure 111.

The plurality of lamp elements 121 forms an electric device. The plurality of lamp elements 121 converts electric energy into the electromagnetic radiation used to illuminate the environment surrounding the invention 100. The plurality of lamp elements 121 releases the generated illumination into an omnidirectional field of illumination. The plurality of lamp elements 121 electrically connects to the switch element 122. The plurality of lamp elements 121 comprises a first lamp element 151, a second lamp element 152, a third lamp element 153, and a fourth lamp element 154.

The first lamp element 151 is an electric circuit element. The first lamp element 151 converts electric energy into a visible illumination. The first lamp element 151 draws electric energy from the power circuit 123 through the switch element 122. The first lamp element 151 generates a portion of the maximum illumination generated by the lamp circuit 102.

The second lamp element 152 is an electric circuit element. The second lamp element 152 converts electric energy into a visible illumination. The second lamp element 152 draws electric energy from the power circuit 123 through the switch element 122. The second lamp element 152 generates a portion of the maximum illumination generated by the lamp circuit 102.

The third lamp element 153 is an electric circuit element. The third lamp element 153 converts electric energy into a visible illumination. The third lamp element 153 draws electric energy from the power circuit 123 through the switch element 122. The third lamp element 153 generates a portion of the maximum illumination generated by the lamp circuit 102.

The fourth lamp element 154 is an electric circuit element. The fourth lamp element 154 converts electric energy into a visible illumination. The fourth lamp element 154 draws electric energy from the power circuit 123 through the switch element 122. The fourth lamp element 154 generates the balance of the maximum illumination generated by the lamp circuit 102.

The second lamp element 152 electrically connects to the first lamp element 151 such that the first lamp element 151 illuminates when the second lamp element 152 is illuminated. The third lamp element 153 electrically connects to the second lamp element 152 such that the first lamp element 151 and the second lamp element 152 are illuminated when the third lamp element 153 is illuminated. The fourth lamp element 154 electrically connects to the third lamp element 153 such that the first lamp element 151, the second lamp element 152, and the third lamp element 153 are illuminated when the fourth lamp element 154 is illuminated.

The switch element 122 controls the flow of electric energy into the plurality of lamp elements 121. The switch element 122 is an electric circuit element. The switch element 122 forms a series electric connection between the power circuit 123 and the plurality of lamp elements 121. The switch element 122 is a five pole single throw (5PST) switch. The switch element 122 controls the flow of electric energy from the power circuit 123 into the plurality of lamp elements 121. The switch element 122 controls the amount of illumination generated by the plurality of lamp elements 121. Each pole of the 5PST structure of the switch element 122 creates a different amount of illumination to be generated. The amount of illumination generated by the lamp circuit 102 is controlled by the switch element 122. The switch element 122 comprises a first pole 161, a second pole 162, a third pole 163, a fourth pole 164, and a fifth pole 165.

The first pole 161 is a pole selected from the 5PST structure of the switch element 122. The first pole 161 forms an electric connection between the power circuit 123 and the first lamp element 151 when the single throw of the switch element 122 is placed in the first pole 161 position. The first pole 161 transmits electric energy from the power circuit 123 to the first lamp element 151. The first pole 161 is used to illuminate the first lamp element 151.

The second pole 162 is a pole selected from the 5PST structure of the switch element 122. The second pole 162 forms an electric connection between the power circuit 123 and the second lamp element 152 when the single throw of the switch element 122 is placed in the second pole 162 position. The second pole 162 transmits electric energy from the power circuit 123 to the second lamp element 152. The second pole 162 is used to illuminate the second lamp element 152 and the first lamp element 151.

The third pole 163 is a pole selected from the 5PST structure of the switch element 122. The third pole 163 forms an electric connection between the power circuit 123 and the third lamp element 153 when the single throw of the switch element 122 is placed in the third pole 163 position. The third pole 163 transmits electric energy from the power circuit 123 to the third lamp element 153. The third pole 163 is used to illuminate the third lamp element 153, the second lamp element 152, and the first lamp element 151.

The fourth pole 164 is a pole selected from the 5PST structure of the switch element 122. The fourth pole 164 forms an electric connection between the power circuit 123 and the fourth lamp element 154 when the single throw of the switch element 122 is placed in the fourth pole 164 position. The fourth pole 164 transmits electric energy from the power circuit 123 to the fourth lamp element 154. The fourth pole 164 is used to illuminate the fourth lamp element 154, the third lamp element 153, the second lamp element 152, and the first lamp element 151.

The fifth pole 165 is a pole selected from the 5PST structure of the switch element 122. The fifth pole 165 does not form an electric connection with the plurality of lamp elements 121. The fifth pole 165 is used to extinguish the illumination generated by the lamp circuit 102.

The power circuit 123 is an electrical circuit. The power circuit 123 powers the operation of the lamp circuit 102. The power circuit 123 is an electrochemical device. The power circuit 123 converts chemical potential energy into the electrical energy required to power the lamp circuit 102. The power circuit 123 comprises a battery 171, a diode 172, a charging port 173, and an external power source 174. The external power source 174 further comprises a charging plug 175 and a second positive terminal 182. The battery 171 further comprises a first positive terminal 181. The battery 171, the diode 172, the charging port 173, the external power source 174, and the charging plug 175 are electrically interconnected.

The battery 171 is an electrochemical device. The battery 171 converts chemical potential energy into the electrical energy used to power the lamp circuit 102. The battery 171 is a commercially available rechargeable battery 171. The chemical energy stored within the rechargeable battery 171 is renewed and restored through use of the charging port 173. The charging port 173 is an electrical circuit that reverses the polarity of the rechargeable battery 171 and provides the energy necessary to reverse the chemical processes that the rechargeable battery 171 initially used to generate the electrical energy. This reversal of the chemical process creates a chemical potential energy that will later be used by the rechargeable battery 171 to generate electricity.

The charging port 173 forms an electrical connection to an external power source 174 using a charging plug 175. The charging plug 175 forms a detachable electrical connection with the charging port 173. The charging port 173 receives electrical energy from the external power source 174 through the charging plug 175. The diode 172 is an electrical device that allows current to flow in only one direction. The diode 172 installs between the rechargeable battery 171 and the charging port 173 such that electricity will not flow from the first positive terminal 181 of the rechargeable battery 171 into the second positive terminal 182 of the external power source 174.

In the first potential embodiment of the disclosure, the external power source 174, the charging plug 175, and the charging port 173 are compatible with USB power requirements.

The following definitions were used in this disclosure:

Actuate: As used in this disclosure, to actuate means to initiate the operation of a machine, a device, or a process. The term actuate can be applied to a component of a larger machine, device or process.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Collimate: As used with this disclosure, the verb to collimate means to redirect or align rays of electromagnetic radiation. Methods commonly used to collimate electromagnetic radiation include, but are not limited to: a) aligning a device that is sensitive to electromagnetic radiation with a source of electromagnetic radiation; and, b) redirecting the path of electromagnetic radiation to align the rays of the electromagnetic radiation with the device that is sensitive to electromagnetic radiation.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Dark: As used in this disclosure, dark refers to: a) a space that is not illuminated; or, b) an object that does not reflect or generate visible electromagnetic radiation.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Electromagnetic Radiation: As used in this disclosure, electromagnetic radiation refers to an interaction between electric fields and magnetic fields that is capable of transmitting energy through a vacuum.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Field of Illumination: As used in this disclosure, a field of illumination refers to an area illuminated by electromagnetic radiation projected from an electrical device such as a lamp or transmission antenna.

Form Factor: As used in this disclosure, the term form factor refers to the size and shape of an object.

Frequency and Wavelength: As used in this disclosure, the terms frequency and wavelength refers to parameters used to describe a wave that transmits or transfers energy. The frequency measures the frequency of passage of a fixed point of the waveform of the wave. The wavelength describes the span of distance between the fixed points of the waveform of two sequential waves. The wavelength and frequency are related by the equation: wavelength×frequency=wave speed. For many types of waves (such as sound and electromagnetic radiation), the speed of the wave can be taken as a constant.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Hand Tool: As used in this disclosure, a hand tool refers to a tool that is small and light enough to allow a person to hold the tool during use.

Handle: As used in this disclosure, a handle is an object by which a tool, object, or door is held or manipulated with the hand.

Illumination: As used in this disclosure, illumination refers to electromagnetic radiation contained with an area. Illumination is a synonym for light, particularly in cases where a measure of the amount of visible electromagnetic radiation in a space is called for. The verb form of illumination is to illuminate and is taken to mean the generation of an illumination.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Lamp: As used in this disclosure, a lamp is an electrical circuit that generates (typically visible spectrum) electromagnetic radiation.

Lantern: As used in this disclosure, a lantern is a lamp with a self-contained power source that allows the lantern to illuminate a space without drawing energy from an external power source. A flashlight is a handheld lantern.

Light: As used in this disclosure, light refers to electromagnetic radiation that illuminates an area. Illumination is a synonym for light, particularly in cases where a measure of the amount of light in a space is called for.

Lens: As used in this disclosure, a lens is a transparent substance through which electromagnetic radiation can pass. The lens refracts the electromagnetic radiation as it passes through the lens. A lens may or may not be formed with curved surfaces that are used to concentrate or disperse the electromagnetic radiation that travels through the lens. A lens can also project a focused image on a surface known as a virtual image. A lens may also be used to change the apparent size of the virtual image. A magnifying lens (also known as a magnifying glass) is a lens that increase the apparent size of a virtual image. A contact lens is a lens that is worn directly on the eye of a patient.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: As used in this disclosure, a maintained switch is a switch that maintains the position that was set in the most recent switch actuation. A maintained switch works in an opposite manner to a momentary switch.

Mirror: As used in this disclosure, a mirror is a surface that is designed to reflect light with a minimum of dispersion or absorption. A mirror may or may not be formed with curved surfaces that are used to concentrate or disperse the light that reflects off the mirror.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Plug: As used in this disclosure, a plug is an electrical termination that electrically connects a first electrical circuit to a second electrical circuit or a source of electricity. As used in this disclosure, a plug will have two or three metal pins.

Poles, Throws, and Switches: As used in this disclosure, the terms pole and throw are descriptions associated with an electrical switch. A pole refers to an electrical circuit the switch feeds electrical current into. The number of poles associated with the switch refers to the maximum number of independent circuits a switch can theoretically support. Because the circuits supported by the poles of a switch can be interconnected, a switch will often support fewer independent electrical circuits than the actual number of poles. The number of throws associated with a switch refers to the maximum number of electrical connections that can be made by the switch.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Rigid Structure: As used in this disclosure, a rigid structure is a solid structure formed from an inelastic material that resists changes in shape. A rigid structure will permanently deform as it fails under a force. See bimodal flexible structure.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Radiation: As used in this disclosure, radiation refers to the discharge of energy from an object. The term is often applied to energy in the form of: a) waves, such as electromagnetic radiation or acoustic energy; b) nuclear radiation such as alpha, beta, and gamma, particle radiation; and, c) gravitational waves. The radiation of electromagnetic waves is often classified by the wavelength of the generated waves, such as ultraviolet and infrared radiation.

Reflection: As used in this disclosure, reflection refers to the change in the direction of a wave as the wave hits the boundary between two media. The direction of the reflected wave remains within the media through which the wave traveled to reach the boundary.

Roughly: As used in this disclosure, roughly refers to a comparison between two objects. Roughly means that the difference between one or more parameters of the two compared objects are not significantly different.

Semisphere: As used in this disclosure, a semisphere is a structure formed in the shape of a half a sphere. Such a structure would be described as semispherical.

Spectrum: As used in this disclosure, a spectrum refers to the distribution and amplitude of the component frequencies of a source of electromagnetic radiation. Spectrums are typically organized and displayed by frequency or frequency range.

Sphere: As used in this disclosure, a sphere refers to a structure wherein every point of the surface of the structure is equidistant from a center point. A circle refers to the two dimensional structure that that is projected onto the bifurcating plane of a spherical section by the surface of the sphere. All the points of the circle are equidistant from a center point that is found by the perpendicular projection of the center of the sphere through the bifurcating plane.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tool: As used in this disclosure, a tool is a device, an apparatus, or an instrument that is used to carry out an activity, operation, or procedure. A tool generally comprises a working element and a handle. The handle of a tool that forms a sub-component of a larger structure is referred to as a mount.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Visible Light: As used in this disclosure, visible light refers electromagnetic radiation with a wavelength in the approximate range of 400 nanometers to 800 nanometers.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A flashlight with illuminating dome member comprising a housing structure and a lamp circuit;

wherein the housing structure contains the lamp circuit;

wherein the housing structure adjusts the field of illumination generated by the lamp circuit;

wherein the lamp circuit is an electric circuit;

wherein the lamp circuit generates the illumination;

wherein the housing structure forms a protected space that contains the lamp circuit;

wherein the housing structure comprises a grip structure and a sliding reflector;

wherein the grip structure inserts through the sliding reflector;

wherein the grip structure is a prism shaped structure;

wherein the grip structure is a hollow tubular structure;

wherein the grip structure forms the protected space that contains the lamp circuit;

wherein the grip structure comprises a first congruent end and a second congruent end;

wherein the first congruent end is a congruent end of the prism structure of the grip structure;

wherein the second congruent end is a congruent end of the prism structure of the grip structure;

wherein the second congruent end is the congruent end of the grip structure that is distal from the first congruent end.

2. The flashlight with illuminating dome member according to claim 1 wherein the flashlight with illuminating dome member is a lantern;

wherein the flashlight with illuminating dome member is a lamp;

wherein the flashlight with illuminating dome member generates an illumination with an adjustable field of illumination;

wherein by adjustable field of illumination is meant that the flashlight with illuminating dome member generates a field of illumination selected from the group consisting of: a) an omnidirectional field of illumination; and, b) a directed field of illumination formed from a collimation of the generated illumination.

3. The flashlight with illuminating dome member according to claim 2 wherein the housing structure is a rigid structure;

wherein the housing structure is a hollow structure;

wherein the housing structure has a tubular structure;

wherein the housing structure is a handheld structure;

wherein the housing structure is a self-standing structure.

4. The flashlight with illuminating dome member according to claim 3 wherein the sliding reflector is a rigid structure;

wherein the sliding reflector is a hollow structure;

wherein the sliding reflector has a roughly truncated pyramid shape;

wherein the sliding reflector is formed with an open base and an open truncated apex;

wherein the sliding reflector forms a roughly tubular shape;

wherein the span of the length of the inner dimension of the sliding reflector is lesser than the span of the length of the outer dimension of grip structure;

wherein the sliding reflector attaches to the grip structure by sliding over the lateral face of the grip structure.

5. The flashlight with illuminating dome member according to claim 4 wherein the sliding reflector attaches to the grip structure in a configuration selected from the group consisting of: a) a base forward position; and, b) a reversed base position;

wherein the base forward position is formed when the sliding reflector slides over the grip structure such that the open base is the structure of the sliding reflector that is proximal to the first congruent end of the grip structure;

wherein the reversed base position is formed when the sliding reflector slides over the grip structure such that the open base is the structure of the sliding reflector that is distal from the first congruent end of the grip structure;

wherein the sliding reflector forms a pedestal structure when the sliding reflector is in the reversed base position;

wherein the sliding reflector maintains the grip structure in a vertically oriented position when the flashlight with illuminating dome member rests on a horizontal supporting surface;

wherein the sliding reflector forms a reflective structure when the grip structure is in the base forward position;

wherein the sliding reflector collimates the light generated by the lamp circuit to form the directed field of illumination when the sliding reflector is in the base forward position.

6. The flashlight with illuminating dome member according to claim 5 wherein the sliding reflector comprises a truncated pyramid structure and a mirror structure;

wherein the truncated pyramid structure forms the primary structure of the sliding reflector;

wherein the truncated pyramid structure has the rough shape of a truncated pyramid;

wherein the truncated pyramid structure is a rigid structure;

wherein the truncated pyramid structure is a hollow structure;

wherein the truncated pyramid structure is formed with the open base and the open truncated apex;

wherein the truncated pyramid structure forms the tubular structure of the sliding reflector;

wherein the grip structure inserts through the truncated pyramid structure by inserting through the open base and the open truncated apex;

wherein the mirror structure mounts in the truncated pyramid structure;

wherein the mirror structure is a reflective structure;

wherein the mirror structure mounts on the interior lateral face of the truncated pyramid structure;

wherein the mirror structure collimates the light generated by the lamp circuit into a unidirectional beam of light that is transmitted into the environment through the open base of the sliding reflector;

wherein the mirror structure collimates the light generated by the lamp circuit when the sliding reflector is in the base forward position;

wherein the lamp circuit is an electric circuit;

wherein the lamp circuit converts electric energy into electromagnetic radiation used to illuminate the environment surrounding the flashlight with illuminating dome member.

7. The flashlight with illuminating dome member according to claim 6 wherein the lamp circuit transmits the electromagnetic radiation into the environment;

wherein the lamp circuit is an independently powered electric circuit;

wherein by independently powered is meant that the lamp circuit can operate without an electrical connection to an external power source.

8. The flashlight with illuminating dome member according to claim 7 wherein the lamp circuit comprises a plurality of lamp elements, a switch element, and a power circuit;

wherein the plurality of lamp elements, the switch element, and the power circuit are electrically interconnected;

wherein the plurality of lamp elements mounts in the first congruent end of the grip structure such that the illumination generated by the lamp circuit is released through the first congruent end;

wherein the switch element mounts in the grip structure such that the switch element is accessible from the exterior lateral face of the grip structure.

9. The flashlight with illuminating dome member according to claim 8 wherein the plurality of lamp elements forms an electric device;

wherein the plurality of lamp elements converts electric energy into the electromagnetic radiation used to illuminate the environment surrounding the flashlight with illuminating dome member;

wherein the plurality of lamp elements releases the generated illumination into an omnidirectional field of illumination;

wherein the plurality of lamp elements electrically connects to the switch element.

10. The flashlight with illuminating dome member according to claim 9 wherein the switch element controls the flow of electric energy into the plurality of lamp elements;

wherein the switch element is an electric circuit element;

wherein the switch element forms a series electric connection between the power circuit and the plurality of lamp elements;

wherein the switch element is a five pole single throw (5pst) switch;

wherein the switch element controls the flow of electric energy from the power circuit into the plurality of lamp elements;

wherein the amount of illumination generated by the lamp circuit is controlled by the switch element;

wherein each pole of the 5pst structure of the switch element creates a different amount of illumination to be generated.

11. The flashlight with illuminating dome member according to claim 10 wherein the plurality of lamp elements comprises a first lamp element, a second lamp element, a third lamp element, and a fourth lamp element;

wherein the first lamp element is an electric circuit element;

wherein the first lamp element converts electric energy into a visible illumination;

wherein the first lamp element draws electric energy from the power circuit through the switch element;

wherein the first lamp element generates a portion of the maximum illumination generated by the lamp circuit;

wherein the second lamp element is an electric circuit element;

wherein the second lamp element converts electric energy into a visible illumination;

wherein the second lamp element draws electric energy from the power circuit through the switch element;

wherein the second lamp element generates a portion of the maximum illumination generated by the lamp circuit;

wherein the third lamp element is an electric circuit element;

wherein the third lamp element converts electric energy into a visible illumination;

wherein the third lamp element draws electric energy from the power circuit through the switch element;

wherein the third lamp element generates a portion of the maximum illumination generated by the lamp circuit;

wherein the fourth lamp element is an electric circuit element;

wherein the fourth lamp element converts electric energy into a visible illumination;

wherein the fourth lamp element draws electric energy from the power circuit through the switch element;

wherein the fourth lamp element generates the balance of the maximum illumination generated by the lamp circuit;

wherein the second lamp element electrically connects to the first lamp element such that the first lamp element illuminates when the second lamp element is illuminated;

wherein the third lamp element electrically connects to the second lamp element such that the first lamp element and the second lamp element are illuminated when the third lamp element is illuminated;

wherein the fourth lamp element electrically connects to the third lamp element such that the first lamp element, the second lamp element, and the third lamp element are illuminated when the fourth lamp element is illuminated.

12. The flashlight with illuminating dome member according to claim 11 wherein the switch element comprises a first pole, a second pole, a third pole, a fourth pole, and a fifth pole;

wherein the first pole is a pole selected from the 5pst structure of the switch element;

wherein the first pole forms an electric connection between the power circuit and the first lamp element when the single throw of the switch element is placed in the first pole position;

wherein the first pole transmits electric energy from the power circuit to the first lamp element;

wherein the first pole is used to illuminate the first lamp element;

wherein the second pole is a pole selected from the 5pst structure of the switch element;

wherein the second pole forms an electric connection between the power circuit and the second lamp element when the single throw of the switch element is placed in the second pole position;

wherein the second pole transmits electric energy from the power circuit to the second lamp element;

wherein the second pole is used to illuminate the second lamp element and the first lamp element;

wherein the third pole is a pole selected from the 5pst structure of the switch element;

wherein the third pole forms an electric connection between the power circuit and the third lamp element when the single throw of the switch element is placed in the third pole position;

wherein the third pole transmits electric energy from the power circuit to the third lamp element;

wherein the third pole is used to illuminate the third lamp element, the second lamp element, and the first lamp element;

wherein the fourth pole is a pole selected from the 5pst structure of the switch element;

wherein the fourth pole forms an electric connection between the power circuit and the fourth lamp element when the single throw of the switch element is placed in the fourth pole position;

wherein the fourth pole transmits electric energy from the power circuit to the fourth lamp element;

wherein the fourth pole is used to illuminate the fourth lamp element, the third lamp element, the second lamp element, and the first lamp element;

wherein the fifth pole is a pole selected from the 5pst structure of the switch element;

wherein the fifth pole does not form an electric connection with the plurality of lamp elements;

wherein the fifth pole is used to extinguish the illumination generated by the lamp circuit.

13. The flashlight with illuminating dome member according to claim 12 wherein the power circuit is an electrical circuit;

wherein the power circuit powers the operation of the lamp circuit;

wherein the power circuit is an electrochemical device.

* * * * *